United States Patent [19]

Gregg

[11] 4,147,097

[45] Apr. 3, 1979

[54] METHOD OF AND APPARATUS FOR MAKING DRIP-TYPE COFFEE

[75] Inventor: Richard Gregg, Cincinnati, Ohio

[73] Assignee: The Procter & Gamble Company, Cincinnati, Ohio

[21] Appl. No.: 892,240

[22] Filed: Mar. 31, 1978

Related U.S. Application Data

[62] Division of Ser. No. 726,073, Sep. 23, 1976.

[30] Foreign Application Priority Data

Sep. 22, 1977 [CA] Canada .................................. 287316

[51] Int. Cl.² .............................................. A47J 31/00
[52] U.S. Cl. ......................................... 99/283; 99/305
[58] Field of Search ................ 99/280, 281, 283, 282, 99/294, 295, 305, 307, 316

[56] References Cited
U.S. PATENT DOCUMENTS 3,220,334  11/1965  Martin .................................... 99/282
3,408,921  11/1968  Freese ................................... 99/295
3,596,588  8/1971   Moss ..................................... 99/282
4,064,795  12/1977  Ackerman .............................. 99/305

*Primary Examiner*—Robert W. Jenkins
*Attorney, Agent, or Firm*—Leonard Williamson; John V. Gorman; Rose A. Dabek

[57] ABSTRACT

A method and apparatus for making drip-type coffee beverage having improved flavor and aroma, and low bitterness characteristics. The method employs an extraction portion consisting essentially of warm 120° F.–75° F. water to infuse or extract roasted and ground coffee by the filter-drip method to issue a relatively strong filtered coffee extract into a container. A bypass-dilution portion of water, preferably 190° F. to 205° F., is added directly to the relatively strong filtered coffee extract to dilute the relatively strong filtered coffee extract to a predetermined beverage concentration at a preferred temperature. Also, a novel two-temperature split-water-stream coffeemaker for making coffee beverages by this method is provided.

10 Claims, 6 Drawing Figures

METHOD OF AND APPARATUS FOR MAKING DRIP-TYPE COFFEE

CROSS REFERENCE TO RELATED APPLICATION

This application is a divisional of a commonly assigned, co-pending application Ser. No. 726,073, filed Sept. 23, 1976.

BACKGROUND

This invention relates to an improvement over the well-known "drip" or filter coffeemaking methods and "drip" coffeemakers. An example of a drip coffeemaker is disclosed in U.S. Pat. No. 3,736,155, issued May 29, 1973 to J. C. Martin.

Much study has been given to the most satisfactory way to brew roast and ground coffee and it is a fact that an excellent grade of coffee properly grown and optimally roasted can be effectively ruined for the coffee table by improper methods of preparation. In general, a high quality and most satisfying coffee drink is obtained only when it possesses fine aroma, delicacy of flavor, and fullness of body, as well as warmth and stimulating character.

These properties can be obtained only when attention is paid to certain details—the freshness of the roasted coffee, a fineness of grind that permits rapid and effective extraction yielding a clear and brilliant infusion and a method of treatment involving time, temperature and equipment, which conserves the delicate volatile constituents of the roast and ground coffee, but avoids the woody and bitter flavors that are invariably found in coffee which has been too long exposed to solvent action of boiling hot water on the ground material. Unfortunately, a number of factors which will influence cup quality will be beyond the effective control of the consumer who will typically prepare a coffee brew from a roast and ground coffee product using conventional percolation on drip-type coffeemakers. It will be appreciated, therefore, that the provision of a method and apparatus capable of preparing a high-quality brew of roast and ground coffee in a simple and effective manner would be advantageous.

Prior art drip coffeemaking methods have provided some of the best-tasting, least bitter, and most reproduceable coffee beverages heretofore available. Conventional drip coffeemaking methods generally use 25 parts of hot water per extraction per part of roast and ground coffee by weight. This hot extraction water usually has a temperature of over 190° F. which has been found to yield a filtered coffee extract having much more bitterness than the coffee of this invention, primarily because of high extraction water temperature.

OBJECTS

An object of the present invention is to provide a method for preparing a coffee beverage having improved flavor and aroma characteristics.

Another object is to provide a method for preparing a flavorful and aromatic coffee beverage of reduced bitterness.

Still another object of the present invention is to provide a method which lends itself to control of temperature and time of contact of water and coffee so as to permit recovery of desired flavor and aroma substances with the exclusion of those less desirable.

Another object of the present invention is to provide a drip coffeemaking method for preparing a coffee beverage having flavor qualities recognizably different from and oft preferred over those of "hot" water drip methods.

Another object is to provide an automatic drip coffeemaker suitable for the preparation in a simple manner of a high-quality brew of roast and ground coffee.

SUMMARY OF THE INVENTION

A drip coffee method and apparatus are provided for making varying amounts of a coffee beverage from roasted and ground coffee primarily for immediate consumption. The drip coffeemaker comprises a drip brew basket-filter means for receiving a bed of roasted and ground coffee, and a means for providing a predetermined quantity of heated water for drip extracting said roast and ground coffee which heated water passes through said bed of roasted and ground coffee and through an aperture in said drip brew basket-filter means into a container positioned below said drip brew basket filter means to provide a filtered coffee extract. The improvement comprises: (a) water receiving means for receiving a predetermined quantity of water; (b) means for dividing the quantity of water into an extraction portion and a bypass-dilution portion; (c) warm water means for forwarding said extraction portion of said water at a predetermined temperature over the roasted and ground coffee at a sufficiently slow rate to cause a relatively strong filtered coffee extract to issue into the container; and, (d) dilution water means for causing the bypass-dilution portion of the water to bypass the bed of roast and ground coffee in the drip brew basket-filter means and for causing the bypass-dilution portion to be forwarded into the container at a preselected temperature substantially different from said predetermined temperature. The coffeemaker further comprises means for causing said bypass-dilution portion to be so related to said extracting portion of said water, and said preselected temperature to be so related to said predetermined temperature to cause said relatively strong filtered coffee extract to be diluted to a preferred beverage concentration at a preferred serving temperature.

The predetermined temperature of the extraction portion is in the range of from about 120° F. to about 175° F. and said preselected temperature of the bypass-dilution portion is preferably from about 190° F. to about 208° F., and the weight ratio of said extraction portion and said roasted and ground coffee is from about 9:1 to about 14:1; preferably, 12:1 to 13:1.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

While the invention will be described in connection with a preferred embodiment illustrated in the Figures, it will be understood that it is not intended to thereby limit the invention to such embodiment. On the contrary, it is intended to cover all alternatives, modifications and equivalents as may be included within the spirit and scope of the invention as defined by the appended claims.

DESCRIPTION OF A PREFERRED EMBODIMENT

Figure 1:
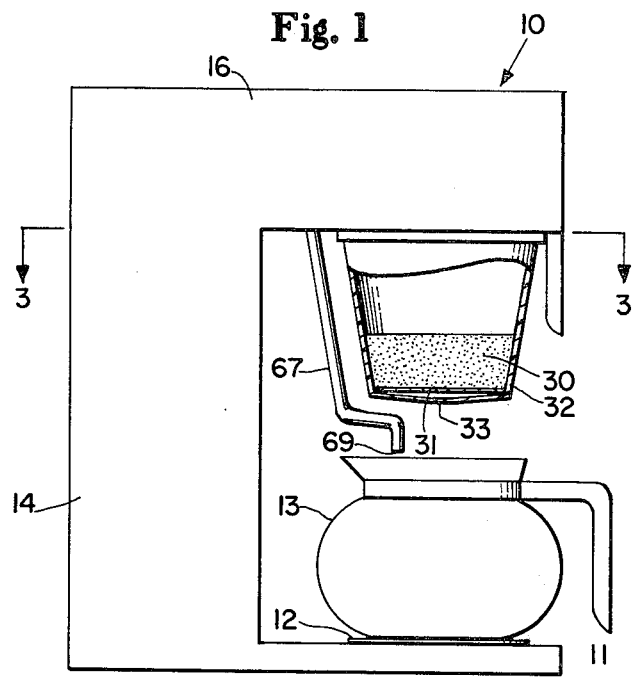
FIG. 1 is a side elevational view of a cold water pour-in, bypass, two-temperature, split-water-stream coffeemaker in which this invention is illustrated and embodied.
Figure 4:
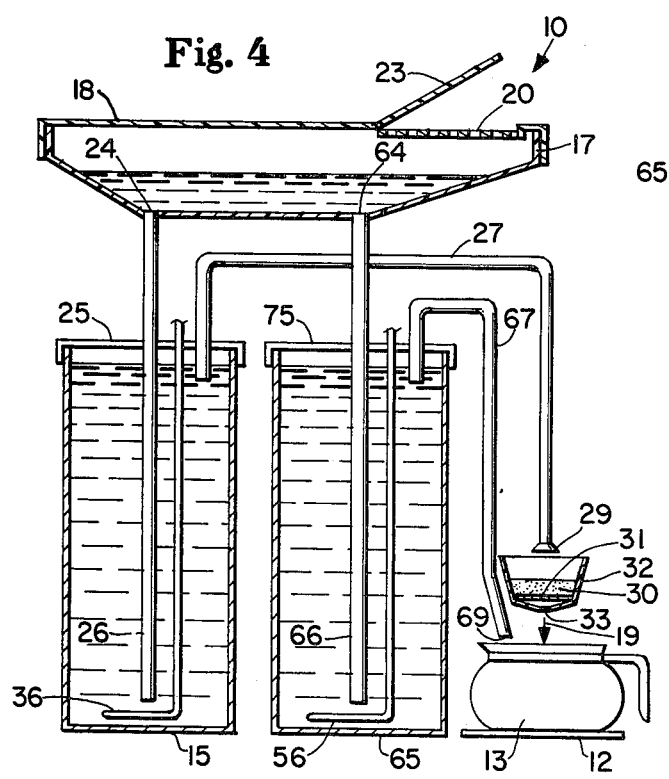
FIG. 4 is a pictorial schematic of the coffeemaker of FIG. 1.
Figure 5:
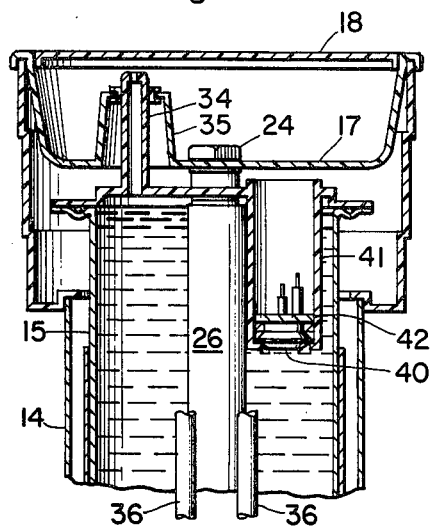
FIG. 5 is an enlarged scale of a sectional view taken generally along the line 5—5 of FIG. 3.

Referring now particularly to FIGS. 1 and 4, it will be observed that 10 designates, generally, a cold water pour-in coffeemaker having the novel two temperature bypass split-water-stream feature. In many respects it is similar to the prior art one-temperature, one-stream coffeemaker described in the patent above referred to. The difference being one stream vs. two, and one temperature vs. two. The coffeemaker 10 is provided with a base 11 which carries a warmer 12 on which a container 13 can be positioned. The base 11 is provided with an upstanding rectangular housing 14 which has mounted therein two cylindrical metallic or plastic water tanks 15 and 65. The water tanks 15 and 65 are identical except for the differences herein indicated and are illustrated in FIG. 5 as tank 15. Tanks 15 and 65 extend into a horizontal upper housing 16 which overlies the base 11 and contains a reservoir 17. The cover 18 is provided with a grill 20 through which a predetermined quantity of cold water can be poured from a beaker when a hinge cover 23 is shifted to the position shown in FIG. 4. The predetermined quantity of water in the reservoir 17 is divided into two portions as it flows through two hollow nuts 24 and 64 which secure the reservoir 17 to tank covers 25 and 75. The cold water flows about equally through the hollow nuts 24 and 64 through inlet water lines or tubes 26 and 66 to the lower ends of the tanks 15 and 65. Of course, the ratios of the portions of water can be varied by any of a number of means which are known to persons skilled in the art, e.g., by substitution of various-sized nut orifices. If nuts 24 and 64 are about equal, and 50 grams of roast and ground coffee are used, about 1250 grams of water are used which water is divided into approximately two equal portions: an extraction portion and a bypass-dilution portion.

Figure 3:
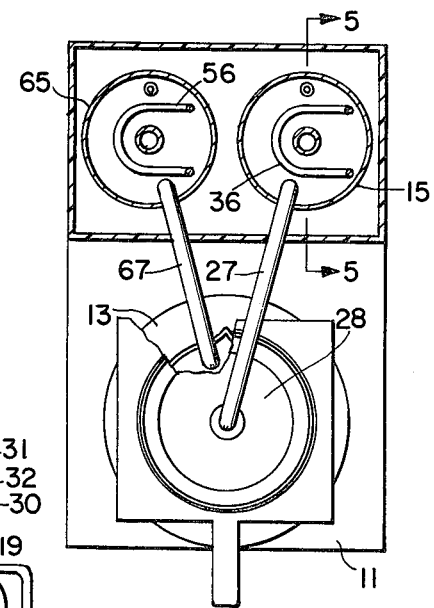
FIG. 3 is a horizontal sectional view taken generally along line 3—3 of FIG. 1.

When cold water flows into the bottom ends of the tanks 15 and 65, warm water disposed at the upper ends of the tanks is displaced and siphoned through warm water means line 27 and dilution water means line 67 as illustrated in FIGS. 3 and 4. One end of the warm water means line 27 opens into the upper end of the tank 15 through the cover 25, and extends underneath the reservoir 17 and through a bottom wall 28 of the upper housing 16 where it terminates in a spray nozzle 29. Extraction portion water which issues from the spray nozzle 29 is distributed over ground coffee bed 30 that is positioned in a drip brew basket 32 on the filter 31 positioned on the bottom of said basket 32. The amount of extraction portion water can range from about 9 to about 14 parts by weight of water per part of dry ground coffee 30. Care should be taken to assure that substantially all of the extraction portion passes through the ground coffee bed 30.

A relatively strong coffee extract 19 flows through an aperture 33 at the bottom of the drip brew basket 32 to the container 13 which is maintained at an elevated temperature by the warmer 12. The siphon action is enabled by a vent tube 34 which is molded integrally with the tank cover 25, FIG. 5, and extends through an upstanding sleeve 35 that is formed integrally with the floor of the reservoir 17. The vent tube 34 places the water tank 15 in direct communication with the atmosphere so that atmospheric pressure is available to cause the warm extraction portion of water to be siphoned out of the tank 15 through the extraction water means line 27 and to the spray nozzle 29. The amount of warm extraction portion water that is siphoned out depends upon the amount of cold water that is poured into the basin 17 and flows through hollow nut 24. Of course, the siphoning action is stopped when the level of water within tank 15 drops below the bottom end of line 27 within tank 15. The water tank 65 is equipped with identical parts as illustrated in FIG. 5 except for the differences set out below.

Figure 6:
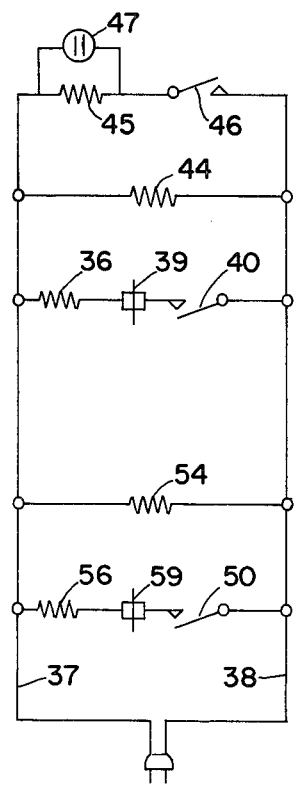
FIG. 6 shows diagrammatically an electrical circuit that can be employed for the coffeemaker.

Referring now particularly to FIGS. 4, 5, and 6, a portion of cold water flows through the hollow nut 64 and through the inlet line or tube 66 to the lower end of tank 65. It will be observed that the water is siphoned out through a dilution water means line 67, one end of which opens into the upper end of the tank 65 through the cover 75 and extends underneath the reservoir 17 and through the bottom wall 28 of the upper housing 16 bypassing drip brew basket 32 where it terminates in a nozzle 69. Hot dilution water having a temperature of about 205° F. issues from the nozzle 69 and is discharged directly into the container 13 to dilute the relatively strong coffee extract aperture 33 in the direction indicated by arrow 19.

In order to heat the two portions of water in the tanks 15 and 65 to the desired temperatures for their extraction and dilution purposes, respectively, electric tank heaters 36 and 56 of the immersion type are suitably mounted respectively within the water tanks 15 and 65. As shown in FIG. 6, the electric tank heaters 36 and 56 are connected for energization between conductors 37 and 38 which are arranged to be connected to a 115 v., 60 Hz. source. The connections to the conductors 37 and 38 are through limit circuit breakers 39 and 59 respectively and two bi-metallic thermostats that are indicated, generally, at 40 and 50 respectively. The thermostats 40 and 50 are arranged to operate over different temperature ranges. For example, thermostat 40 is arranged to complete the energizing circuit for the electric tank heater 36 when the temperature of the water in the tank 15 falls to 130° F. The electric tank heater 36 continues to be energized until the temperature of the water in the tank 15 reaches about 160° F. In the other tank, thermostat 50 is arranged to complete the energizing circuit for the electric tank heater 56 when the temperature of the water in the tank 65 falls to 190° F. The electric tank heater 56 continues to be energized until the temperature of the water in the tank 65 reaches about 205° F.

Preferably, thermostat 40 as shown and illustrated in FIG. 5, and thermostat 50 not shown, are located at the bottom ends of tubes 41 and 51, not shown, that are formed integrally with the tank cover 25, and 75 respectively. Thermostat 40 is suitably sealed at the lower end of the tube 41 by sealing compound indicated at 42.

With a view to offset non-use period heat losses from the tanks 15 and 65, blanket electric heaters 44 and 54 surround the lower portions of the tanks 15 and 65 respectively. This is shown diagrammatically in FIG. 6 where electric heaters 44 and 54 are connected continuously between the conductors 37 and 38.

Figure 2:
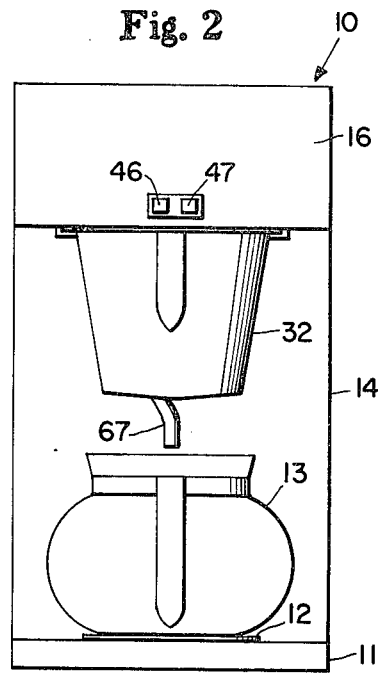
FIG. 2 is a front elevational view of the coffeemaker of FIG. 1.

As shown in FIG. 6, an electric heating element 45 is provided for the warmer 12 and is arranged to be connected between the conductors 37 and 38 on operation of switch 46 which is located at the front end of the upper housing 16, FIG. 2. An indicator light 47 is connected across the element 45 to show that it is energized when the switch 46 is closed.

As indicated above, both tanks 15 and 65 operate identically except for the temperature differences and the water line differences as pointed out above.

DETAILED DESCRIPTION OF THE METHOD

The present drip coffeemaking method for preparing beverage coffee requires a discussion of each of several factors or conditions concerned in the process. The interpretation of the results is not only in terms of chemistry, but also in terms of consumer reaction.

First of all, the temperature of the extraction portion (infusion) water plays an important part in this method. The higher the temperature of the extraction water the more bitter the coffee extract will tend to be. Boiling hot water should not be used for extraction because it increases the bitter flavor notes. The broadest temperature range is from about 49° C. to about 79° C. (120° F. to 175° F.). The preferred temperature range for the extraction portion of the water is from about 130° F. to about 170° F. and the most preferred is from about 145° F. to about 165° F. Of course, these are the temperatures of the water portions when they leave the tanks. Some heat is lost during the infusion. At these temperatures the desirable coffee solubles are dissolved, the flavor-giving volatiles are not so largely boiled off, and certain changes resulting in bitterness are largely avoided. The best amount of extraction water is discussed below.

The time of infusion should be as brief as possible. Prolonged infusion, even at the above temperatures, can increase the bitter taste, decrease the flavor and aroma, and make the resulting beverage less acceptable to consumers. A short period of time between addition of water to a coffeemaker and the production of ready-to-drink beverage is an advantage. The process of this invention can provide a pot of 10 to 12 cups of delicious hot coffee in from about 8 to about 10 minutes or less.

For best results, coffee grinds ranging from coarse-medium to fine should be used as defined in Table 1. The preferred grinds range from medium-coarse to fine-medium, as defined in Table 1 as grinds of which about 35% to about 75% by weight pass through a No. 28 Tyler screen. Preferably, the coffee grind will be such that from about 45% to about 65% will pass through a No. 28 Tyler screen, e.g., from about 50% to about 60%.

For extraction, the use of less water as well as cooler water than conventionally used in drip methods is critical in the practice of the present invention. Conventional drip coffeemaking methods generally use 25 parts of hot water per part of roast and ground coffee by weight. This predetermined quantity of 25 parts water will give a filtered coffee extract having about 0.9% soluble coffee solids, but the extract may have an off-flavor if all 25 parts are used for extraction.

TABLE 1

| | Correlation of descriptive and numerical scale | | |
|---|---|---|---|
| Common name | Eleven point descriptive scale | 100 point percentage scale[1] (mid-points) | Class limits |
| | extremely coarse | 0 | 0–5 |
| Percolator | very coarse | 10 | 5–15 |
| Drip | coarse | 20 | 15–25 |
| Vacuum | coarse - medium 30 | 25–35 | |
| | medium - coarse | 40 | 45–55 |
| | medium (preferred) | 50 | 45–55 |
| | medium - fine | 60 | 55–65 |
| | fine - medium | 70 | 65–75 |
| | fine | 80 | 75–85 |
| | very fine | 90 | 85–95 |
| | extremely fine | 100 | 95–100 |

[1]Based on percentage of sample passing No. 28 Tyler screen.
Taken from Coffee Grinds II Classification and Analysis, Publication No. 39, 1966, The Coffee Brewing Center, New York.

It has been discovered that most of the desirable soluble coffee solids are extracted in about the first half of that quantity of water. Therefore, in the practice of the present invention, an extraction portion of water is used for extraction to provide a relatively strong filtered coffee extract which is afterwards diluted to beverage strength. The larger the amount of extraction portion water used the more bitter the coffee extracted will tend to be. Thus, generally speaking, if 9 parts of water are used for the extraction portion water, the coffee beverage will be less bitter than a coffee beverage prepared when 14 parts of extraction water are used.

Referring still to the conventional drip coffeemaking methods described above, it has further been discovered that most of the bitterness components are extracted from the roast and ground coffee in about the last half of the 25 parts of water, even at the above lower temperatures. Therefore, in the practice of the present invention, a bypass-dilution portion of water is used to dilute the relatively strong filtered coffee extract. The bypass-dilution portion "bypasses" the bed of roast and ground coffee in the drip brew basket means. In the practice of the present invention the conventional quantity of extraction water (25 parts per part of coffee) is divided into the two aforesaid portions: the extraction portion, and the bypass-dilution portion.

The total of these two portions of water to dry coffee ratio will generally be from about 22 to 1 to about 26:1, preferably 25:1.

In the practice of the present invention, the weight ratio of the extraction portion of water to dry, roast and ground coffee is from about 9:1 to about 14:1; preferably from about 12:1 to about 13:1. When this amount of water is used for drip extraction, a relatively strong (meaning concentrated but not bitter) filtered coffee extract is issued. Normally, this extract will have a soluble solids content by weight of from about 1.5% to about 2.6%. The relatively strong filtered coffee extract is then diluted with a sufficient amount of bypass-dilution water to a preferred beverage concentration. Most of the bitterness is left in the spent coffee grounds and a high quality coffee brew results.

In a preferred method, as the infusion is being filtered from the grounds and issues into a container below, the relatively strong filtered extract is simultaneously being diluted to a preferred beverage concentration and warmed up to a preferred serving temperature. In general, the undiluted filtered coffee extract of the present invention will be too strong and too cool for most consumers. Of course, the temperature of the filtered coffee extract will be 20° to 30° cooled than the beginning temperature of the extraction portion water due to heat expended during the extraction operation. So, the relatively cool undiluted extract is diluted with an effective amount of a bypass-dilution portion water, and preferably with 190° F.-208° F. water, to obtain a preferred serving temperature in the range of about 170° F. to about 185° F. as well as a preferred beverage concentration and thereby approaching the perfect cup of coffee.

The preferred range of temperature for the bypass-dilution portion of water is from about 190° F. to about 208° F. because it heats the beverage to the preferred serving temperature of about 180° F. very quickly. Again, care must be taken not to pass this hot water through the bed of coffee in the drip brew basket-filter means. Alternatively, in the method of the present invention cold water or warm water having the same temperature as the extraction portion may be used for the bypass-dilution portion. However, the coffee beverage must then be warmed up to serving temperatures on a hot plate or warmer, unless relatively cool coffee is desired.

The fineness of the grind exerts an influence on the (quality) flavor as well as the degree of extraction (quantity). It has been discovered that a mixture of coarse and extremely fine grinds (e.g., a 50—50 mixture) give excellent results in the practice of the present invention. But, coarse grinds alone give extracts which quantity must be sacrificed and extremely fine grinds alone filters slowly and sacrifice some quality.

EXAMPLE I

Twelve hundred fifty grams of cold water is poured into a two-temperature split-water-stream automatic drip coffeemaker. About 625 g. of 155° F. extraction portion water is passed through a bed of about 50 g. of medium grind roast and ground coffee into a container below to provide a relatively strong filtered coffee extract having a solids content of about 2.1%. About 625 g. of 205° F. bypass-dilution portion water is passed directly into said container to dilute the strong extract and yield a total of about 1050 g. of coffee beverage having a temperature of about 183° F. and a solids content of about 0.9%.

Coffee brews prepared using the present drip brew method and apparatus were described by expert coffee tasters as very good, low in bitterness, good strength, full bodied, rich and aromatic as well as being preferred over conventional brews.

While several embodiments of the present invention have been illustrated and described, it is not intended to thereby limit the present invention; particularly not to two tank automatic drip coffeemakers. Rather, it will be obvious to those skilled in the art that various changes and modifications can be made without departing from the spirit and scope of the invention. It is intended, therefore, to cover in the appended claims all such changes and modifications that are within the scope of this invention.

What is claimed is:

1. A drip coffeemaker for making varying amounts of a coffee beverage from roasted and ground coffee primarily for immediate consumption, said drip coffeemaker comprising a drip brew basket-filter means for receiving a bed of roasted and ground coffee, and means for providing a predetermined quantity of heated water for drip extraction from said roast and ground coffee, which heated water passes through said bed of roast and ground coffee through an aperture in drip brew basket-filter means into a container positioned below said drip brew basket-filter means to provide a filtered coffee extract, the improvement comprising:
   a. water receiving means for receiving a predetermined quantity of water;
   b. means for dividing said predetermined quantity of water into an extraction portion and a bypass-dilution portion,
   c. warm water means for forwarding said extraction portion of said water at a predetermined temperature over said roasted and ground coffee at a sufficiently slow rate to cause a relatively strong filtered coffee extract to issue into said container; and,
   d. dilution water means for causing said bypass-dilution portion of said water to bypass said bed of roast and ground coffee and for causing said bypass-dilution portion to be forwarded into said container at a pre-selected temperature substantially different from said pre-determined temperature, said coffeemaker further comprising means for causing said bypass-dilution portion to be so related to said extraction portion of said water and said pre-selected temperature to be so related to said predetermined temperature to cause said relatively strong coffee extract to be diluted to a predetermined beverage concentration at a preferred serving temperature.

2. The coffeemaker of claim 1 wherein said predetermined temperature of said extraction portion is in the range of from about 120° F. to about 175° F., said preselected temperature of said bypass-dilution portion is from about 190° F. to about 208° F., and wherein the ratio of said extraction portion of said predetermined quantity of water to said roasted and ground coffee is from about 9:1 to about 14:1 by weight.

3. The coffeemaker of claim 2 wherein said extraction portion has a temperature in the range of about 145° F. to about 165° F.

4. The coffeemaker of claim 1 wherein said extraction portion of said water has a temperature in the range of about 130° F. to about 170° F.

5. The coffeemaker of claim 1 wherein said roast and ground coffee is a grind of which from about 35% to about 75% passes through a No. 28 Tyler screen.

6. The coffeemaker of claim 1 wherein said bypass-dilution portion of said water has a temperature of at least about 190° F., and wherein said dilution portion also warms the filtered-coffee extract to a preferred beverage serving temperature.

7. The coffeemaker of claim 6 wherein said serving temperature is in the range of about 170° F. to about 185° F.

8. The coffeemaker of claim 1 wherein said weight ratio is from about 12:1 to about 13:1.

9. The coffeemaker of claim 1 wherein said roast and ground coffee is a grind of which about 50% to about 60% passes through a No. 28 Tyler screen.

10. The coffeemaker of claim 1 wherein said relatively strong filtered coffee extract has a soluble solids content of about 1.5 to about 2.6 percent.

* * * * *

UNITED STATES PATENT AND TRADEMARK OFFICE
CERTIFICATE OF CORRECTION

PATENT NO. : 4,147,097
DATED : April 3, 1979
INVENTOR(S) : Richard Gregg

It is certified that error appears in the above-identified patent and that said Letters Patent are hereby corrected as shown below:

In the ABSTRACT, line 5, "-75°F" should be -- -175°F --.

Col. 7, line 1, "cooled" should be -- cooler --.

Col. 6, line 8, the figures "30" and "25-35" should be moved under the columns "100 point..." and "Class limits", respectively.

Signed and Sealed this

Twenty-sixth Day of June 1979

[SEAL]

Attest:

RUTH C. MASON
Attesting Officer

DONALD W. BANNER
Commissioner of Patents and Trademarks